(12) United States Patent
Baron et al.

(10) Patent No.: US 6,371,490 B1
(45) Date of Patent: Apr. 16, 2002

(54) FLAT GASKET

(75) Inventors: Ralf Baron, Metzingen; Wilhelm Kullen, Hülben; Wolfgang Wondraschek, Leonberg, all of (DE)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 09/334,011

(22) Filed: Jun. 15, 1999

(30) Foreign Application Priority Data

Jun. 25, 1998 (DE) .......................................... 298 11 346

(51) Int. Cl.[7] .............................. F16J 15/08; F16J 15/32; F16B 13/04
(52) U.S. Cl. ........................ 277/598; 277/630; 411/531
(58) Field of Search ................................ 277/598, 637, 277/630; 411/531, 535, 542, 544

(56) References Cited

U.S. PATENT DOCUMENTS

| | | | | |
|---|---|---|---|---|
| 4,648,607 A | * | 3/1987 | Yamada et al. | 277/598 |
| 4,776,601 A | * | 10/1988 | Yamada | 277/598 |
| 5,083,801 A | * | 1/1992 | Okano et al. | 277/598 |
| 5,095,867 A | * | 3/1992 | Inamura | 123/193.3 |
| 5,096,325 A | * | 3/1992 | Udagawa | 277/598 X |
| 5,154,529 A | * | 10/1992 | Udagawa et al. | 277/598 X |
| 5,259,629 A | * | 11/1993 | Udagawa | 277/598 |
| 5,375,851 A | * | 12/1994 | Mockenhaupt | 277/598 |
| 5,513,855 A | * | 5/1996 | Yasui | 277/598 |
| 5,544,902 A | * | 8/1996 | Belter | 277/598 X |
| 5,551,702 A | * | 9/1996 | Inamura | 277/598 |
| 5,586,770 A | * | 12/1996 | Udagawa et al. | 277/598 |
| 5,673,920 A | | 10/1997 | Mockenhaupt | 277/9.5 |
| 5,791,660 A | * | 8/1998 | Belter | 277/598 |
| 6,193,237 B1 | * | 2/2001 | Schweiger et al. | 277/598 |

FOREIGN PATENT DOCUMENTS

FR 1006927 * 4/1952 ................ 411/531

* cited by examiner

Primary Examiner—Robert G. Santos

(57) ABSTRACT

Flat gasket with a gasket plate which has at least one screw hole for the passage of the threaded shaft of a screw and is formed in the region of this screw hole by a sheet-metal layer, the sheet-metal thickness of which would make an engagement of the sheet-metal layer in a thread of the threaded shaft possible, wherein for the secure centering of the threaded shaft in the screw hole the sheet-metal layer has in its edge region bordering on the screw hole at least one centering element which is formed by the sheet-metal layer and bent out of its plane and prevents any engagement of the sheet-metal layer in a thread, the centering element being designed such that it can be bent back at least approximately into the plane of the sheet-metal layer during the tightening of the screw.

9 Claims, 2 Drawing Sheets

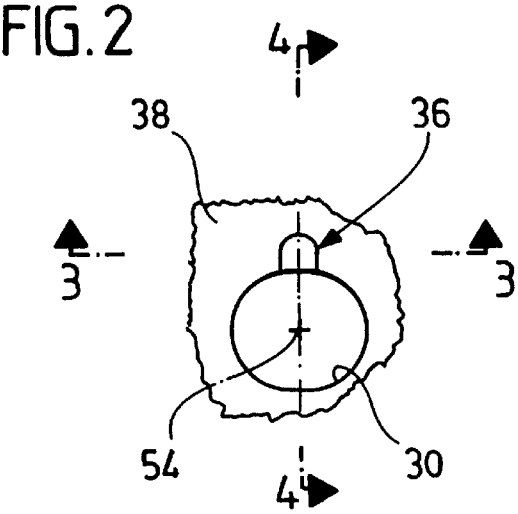
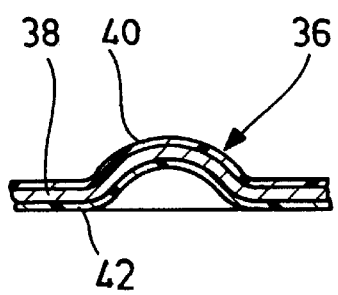
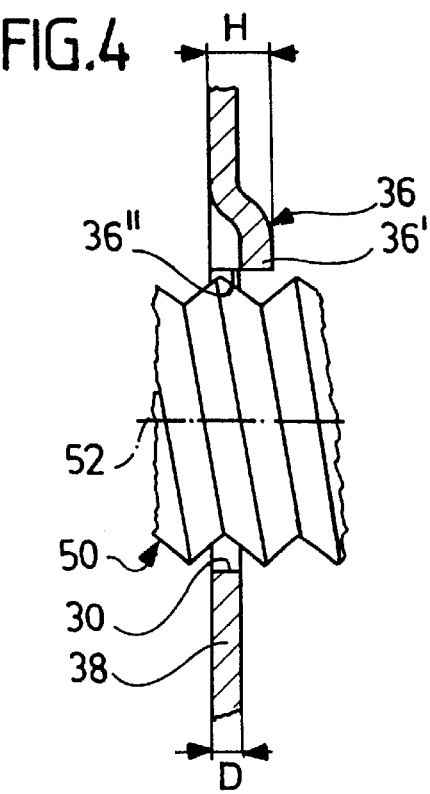
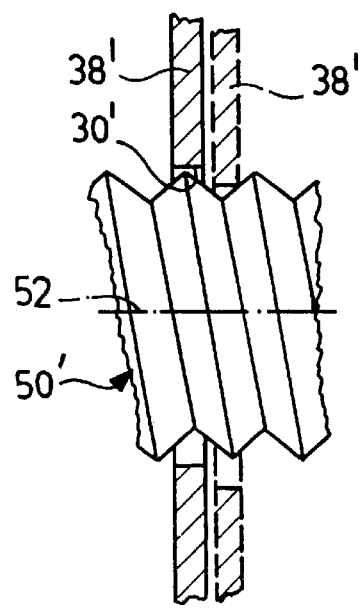
PRIOR ART

FLAT GASKET

The invention relates to a flat gasket with a gasket plate which has at least one hole for the passage of a threaded shaft, in particular, the threaded shaft of a screw and is formed in the region of this hole by a sheet-metal layer with a relatively slight sheet-metal thickness.

Above all in the case of combustion engines, flat gaskets are used ever more frequently, for example, as exhaust manifold gaskets and cylinder head gaskets and their gasket plate consists essentially of one or more sheet-metal layers which is or are, where applicable, coated completely or partially with a, for example, elastomeric mass, wherein in the case of multiple-layer gasket plates one sheet-metal layer can form a carrier plate which is provided on one or both sides with a support formed from an additional sheet-metal layer and not congruent with the carrier plate so that a screw hole can be formed only in one of these sheet-metal layers.

Screws or threaded bolts, which are pushed through the screw holes of the gaskets, serve for the assembly of such flat gaskets, wherein during the assembly or during the transport of the gaskets to the place of assembly the gaskets can hang on the screws (in this case, the plane of the gasket plate extends at least approximately vertically); there is then, above all, in the case of a sheet-metal layer with a correspondingly slight sheet-metal thickness the risk of the edge region of this sheet-metal layer, which borders on a screw hole, slipping into a thread of the screw or the threaded bolt and, consequently, of the screw or the threaded bolt no longer being located centrally in the circular screw hole. When a gasket is to be positioned correctly and exactly on the engine by means of the screws or threaded bolts, the result of such an engagement of the sheet-metal layer in a thread is that the gasket, in certain circumstances, is inadvertently not assembled in the required position relative to structural parts of the engine which are to be sealed relative to one another, which can, for example, lead to leakages because modern engine constructions normally require a very exact positioning of sealing elements, such as, for example, beads, of such gaskets.

To avoid this problem in the case of a flat gasket with a gasket plate which has at least one hole for the passage of a threaded shaft and is formed in the region of this hole by a sheet-metal layer, the sheet-metal thickness of which would make an engagement of an edge region bordering on the hole in a thread of the threaded shaft possible, it is suggested in accordance with the invention to design the gasket such that for the centering of the threaded shaft in the hole the sheet-metal layer has in its edge region bordering on the hole at least one centering element which is formed by the sheet-metal layer and bent out of its plane, prevents any engagement of the sheet-metal layer in a thread and during the tightening of the screw can be bent back at least approximately into the plane of the sheet-metal layer without any great expenditure of force, namely such that as a result the centering element is pressed at least almost flat and cannot lead, for example, on account of any formation of folds or the like to any undesired, appreciable thickening of the sheet-metal layer in the region of the said hole such as could be the case when a sheet-metal tongue projecting from the edge of the hole is used as centering element and this has been bent out of the plane of the sheet-metal layer such that it forms with this plane an angle of, for example, 90° and abuts against the circumference of the threaded shaft.

When, as is often the case, flat gaskets with a gasket plate oriented approximately vertically are mounted in a suspended manner on the said screws or threaded shafts, namely such that a quite specific outer edge region of the gasket plate is located at the top, a single centering element is sufficient per screw hole and this is arranged such that it is supported from above on the outer circumference of the threaded shaft; when these preconditions need not, however, always be present, it is recommended that the gasket be designed such that the sheet-metal layer has several centering elements which are arranged, in particular, at a distance from one another (around the screw hole).

So that the centering element can be bent back as easily as possible into the plane of the sheet-metal layer, it is advantageous when it extends only over the circumferential angle of the screw hole required for the centering of the screw—if the extension of the centering element in circumferential direction of the screw hole is too small, it is not ensured for every design of the centering element that this cannot engage in a thread.

In principle, the centering element can have the most varied of geometrical shapes; when seen from the center of the screw hole towards the rim of the edge region of the sheet-metal layer bordering on the screw hole, the centering element can have, for example, the following shapes: the shape of an approximately semicircular bead, an S lying on its side or a V or, however, even the shape of a diagonally drawn-out Z, wherein the middle arm of the Z extends approximately transversely to the direction of the thread pitch; the centering element can, however, also be formed in that the edge region of the sheet-metal layer surrounding the screw hole is slotted in an approximately radial direction and then one of the two regions bordering on the slot or both the regions of the sheet-metal layer bordering on the slot is or are bent up out of the plane of the sheet-metal layer in the direction of the axis of the hole (in the case where both regions are bent up, these can be bent out of the plane of the sheet-metal layer in opposite directions), and, finally, it is also conceivable to provide two slots arranged at a slight distance from one another and extending approximately radially in relation to the axis of the hole and to fold the sheet-metal tongue thereby resulting and located between the two slots in relation to the plane of the sheet-metal layer, i.e. tilt the tongue somewhat about the central axis.

In all the cases, the centering element can not only be returned to its shape easily but it also allows, and also in the case of several centering elements per screw hole, the gaskets to be fitted onto the threaded shafts easily without the edge of the hole hooking on the ridges of the threads which has previously made the assembly procedure more difficult.

Embodiments are particularly preferred, with which the centering element is connected to and merges into the actual sheet-metal layer at its edges extending transversely to the edge of the screw hole, since not only problems with the packaging of flat gaskets can be avoided with embodiments of this type but also any risk of injury during the handling of inventive gaskets.

With embodiments of this type, the centering element could be punched free at its edge facing away from the screw hole; such inventive gaskets are, however, preferred, with which the centering element is also connected to and merges into the actual sheet-metal layer at its edge facing away from the screw hole.

It is of advantage not only with respect to the production but also the functioning of the centering element and the ease with which this can be bent back when this has the shape of a burl stamped out of the sheet-metal layer and open towards the center of the hole.

The centering element may be bent back into the plane of the actual sheet-metal layer during the assembly of the gasket the easiest and certainly pressed flat without any formation of folds when the edge region of the centering element facing the center of the screw hole extends parallel to the actual sheet-metal layer.

Additional features, advantages and details of the invention result from the attached drawings as well as the following description of one particularly preferred embodiment of the invention; in the drawings:

FIG. 2 shows the section Y from FIG. 1 on an enlarged scale;

FIG. 3 shows a section along the line 3—3 in FIG. 2;

FIG. 4 shows a section along the line 4—4 in FIG. 2 but with a portion of a threaded shaft inserted through the screw hole shown in FIG. 2, and FIG. 5 shows an illustration corresponding to FIG. 4, but without a centering element, for explaining the problem to be solved with the invention.

Figure 1:
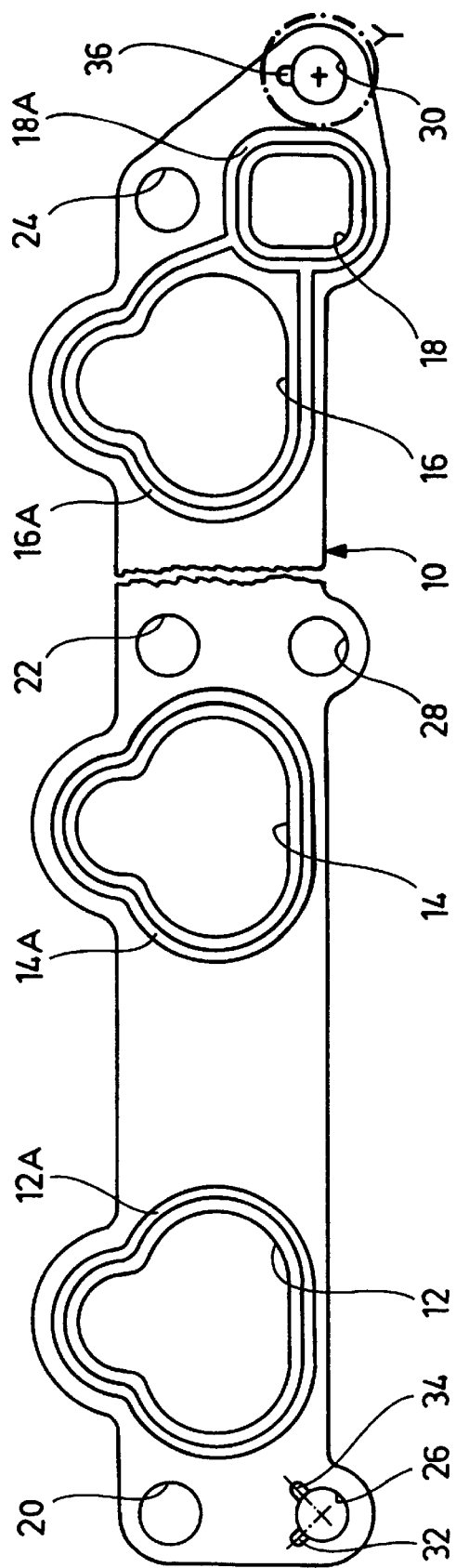
FIG. 1 shows a plan view of an inventive flat gasket designed as an exhaust manifold gasket.

FIG. 1 shows a flat gasket designated as a whole as 10 and having several through openings 12, 14, 16 and 18 for media to be sealed and several screw holes 20, 22, 24, 26, 28 and 30, of which the circular screw holes 26 and 30 are provided with inventive centering elements 32 and 34 or 36. As is apparent from FIG. 3 in conjunction with FIG. 1, the gasket plate of the flat gasket 10 consists of a single sheet-metal layer 38 which is coated completely on both sides with a preferably elastomeric sealing material, wherein the coatings are designated in FIG. 3 as 40 and 42. The flat gasket 10 has around the through openings 12, 14, 16 and 18 sealing elements 12A, 14A, 16A and 18A which, as is known, are intended to be designed as beads of the gasket plate which are approximately shaped like a circular arc in cross section but do not require any further explanation because these sealing elements are not, as such, the subject matter of the present invention.

The two centering elements 32 and 34 associated with the screw hole 26 have from one another a center-to-center distance of approximately 90°, and all three centering elements 32, 34 and 36 are preferably of the same design so that it is sufficient to describe only the configuration of the centering element 36 in the following. This is intended to be done on the basis of FIGS. 2 to 4, wherein the coatings 40 and 42 have, however, been omitted in FIG. 4 for the sake of simplicity of the illustration.

First of all, the problems underlying the invention will, however, be explained on the basis of FIG. 5.

FIG. 5 shows a sheet-metal layer 38' with a screw hole 30' for the passage of a threaded shaft 50' and is intended to be of a flat design at least in the vicinity of the screw hole 30', wherein FIG. 5 shows the sheet-metal layer 38' with solid and dashed lines in two different positions in relation to the threaded shaft 50'—in the position to the left according to FIG. 5 and illustrated with solid lines, the threaded shaft 50' is located centrally in the screw hole 30', in the right position illustrated with dashed lines, however, eccentrically. The axis designated in FIGS. 4 and 5 as 52 represents in all the cases the axis of the threaded shaft and in the position of the sheet-metal layer 38' illustrated to the left in FIG. 5 the axis of the screw hole 30' at the same time. When the sheet-metal thickness of the sheet-metal layer 38' is so slight that the edge region of the sheet-metal layer 38' bordering on the screw hole 30' can engage in a thread of the threaded shaft 50', it is possible—as illustrated to the right in FIG. 5—for the screw hole 30' to take up a position eccentric in relation to the axis 52 of the threaded shaft, namely, in particular, when the sheet-metal layer 38' is handled whilst suspended on the threaded shaft 50'.

In the preferred embodiment illustrated in the drawings the centering element 36 has the shape of an extremely short bead which is oriented approximately radially in relation to the axis of the screw hole 30 designated as 54 in FIG. 2, is open towards the screw hole 30 and merges uniformly into the actual gasket plate at its edges extending transversely to the edge of the screw hole as well as at its edge facing away from the screw hole. As illustrated in FIG. 4, the edge region 36' of the centering element 36 facing the center of the screw hole 30 extends parallel to the plane of the actual gasket plate.

The dimensions of the centering element 36 in circumferential direction of the screw hole 30 and the height H of the centering element shown in FIG. 4 are coordinated with the thickness D of the sheet metal and the pitch of the thread and shape of the thread of the threaded shaft 50 such that the width and the orientation of the rim 36" of the centering element 36 facing the screw hole 30 prevent the gasket plate or rather the sheet-metal layer 38 from being able to engage in a thread of the threaded shaft 50, as is easily apparent from FIG. 4; on the contrary, the rim 36" is always supported on a ridge of the thread and thereby on the outer circumference of the threaded shaft 50.

What is claimed is:

1. A combination of at least one screw and a flat gasket, said gasket including a gasket plate having at least one screw hole for the passage of a threaded shaft of said at least one screw and being formed in the region of said at least one screw hole by a sheet-metal layer defining a plane and having a sheet-metal thickness allowing an edge region bordering on said at least one screw hole to engage in a thread of the threaded shaft, said at least one screw hole having a center, wherein for centering the threaded shaft in said at least one screw hole the sheet-metal layer has in said region at least one centering element formed by the sheet-metal layer and prebent out of said plane defined by said sheet-metal layer before said at least one screw is passed through said at least one screw hole, said centering element having a rim facing said at least one screw hole, said rim, when seen from the center of said at least one screw hole, having (i) at least one rim portion being inclined relative to said plane, and (ii) a width and a shape and orientation relative to said plane so as to always support on a ridge of a thread of said threaded shaft and to prevent any engagement of the sheet-metal layer in a thread of said threaded shaft, and said centering element being adapted to be bent back at least approximately into said plane during a tightening of said at least one screw.

2. The combination of claim 1, characterized in that said at least one centering element extends only over a circumferential angle of said at least one screw hole required for the centering of said at least one screw.

3. The combination of claim 1, characterized in that said at least one centering element is connected to and merges into the actual sheet-metal layer at the margins of said at least one centering element extending transversely to the edge region of said at least one screw hole.

4. The combination of claim 1, characterized in that said at least one centering element is connected to and merges into the actual sheet-metal layer at the margin of said at least one centering element facing away from the edge region of said at least one screw hole.

5. The combination of claim 3, characterized in that said at least one centering element has the shape of a burl or bead embossed out of the plane of the sheet-metal layer and opens towards the center of said least one screw hole.

6. The combination of claim 1, characterized in that the rim of said at least one centering element facing the center of said least one screw hole has another rim portion extending approximately parallel to the plane of the sheet-metal layer.

7. The combination of claim 1, characterized in that the sheet-metal layer has several centering elements.

8. The combination of claim 7, characterized in that the centering elements, in circumferential direction of the screw hole, are arranged at a distance from one another.

9. The combination of claim 1, characterized in that said at least one centering element, when seen from the center of said at least one screw hole towards said edge region of the sheet-metal layer, has a contour in the shape of an approximate circular arc with areas merging into the actual sheet-metal layer likewise in the shape of an approximate circular arc.

* * * * *

UNITED STATES PATENT AND TRADEMARK OFFICE
CERTIFICATE OF CORRECTION

PATENT NO.    : 6,371,490 B1                                         Page 1 of 1
DATED         : April 16, 2002
INVENTOR(S)   : Ralf Baron et al.

It is certified that error appears in the above-identified patent and that said Letters Patent is hereby corrected as shown below:

<u>Column 5,</u>
Line 1, replace "another" with -- -a- --.

Signed and Sealed this

Second Day of July, 2002

Attest:

Attesting Officer

JAMES E. ROGAN
Director of the United States Patent and Trademark Office